(12) United States Patent
Reagan

(10) Patent No.: US 8,926,734 B2
(45) Date of Patent: Jan. 6, 2015

(54) INDUCED-DRAFT INJECTION SYSTEMS AND METHODS

(75) Inventor: Luke Reagan, Cartersville, GA (US)

(73) Assignee: The Southern Company, Atlanta, GA (US)

( * ) Notice: Subject to any disclaimer, the term of this patent is extended or adjusted under 35 U.S.C. 154(b) by 261 days.

(21) Appl. No.: 13/474,542

(22) Filed: May 17, 2012

(65) Prior Publication Data

US 2012/0294769 A1 Nov. 22, 2012

Related U.S. Application Data

(60) Provisional application No. 61/487,064, filed on May 17, 2011.

(51) Int. Cl.
B01D 53/02 (2006.01)
B01D 53/10 (2006.01)
F23J 15/00 (2006.01)

(52) U.S. Cl.
CPC ............... *B01D 53/10* (2013.01); *F23J 15/003* (2013.01); *B01D 2253/102* (2013.01); *B01D 2257/602* (2013.01); *B01D 2258/0291* (2013.01); *F23J 2215/60* (2013.01); *F23J 2219/30* (2013.01)
USPC ............... 95/107; 95/134; 110/203; 110/345; 423/210

(58) Field of Classification Search
CPC .................. B01D 2253/102; B01D 2257/602; B01D 2258/0291; B01D 53/10; F23J 15/003; F23J 2215/60; F23J 2219/30
USPC .............. 95/107, 134; 110/203, 345; 423/210
See application file for complete search history.

(56) References Cited

U.S. PATENT DOCUMENTS

| 4,728,342 | A | * | 3/1988 | Abom ............................ 95/107 |
| 6,042,636 | A | * | 3/2000 | Aishima et al. .................... 95/92 |
| 7,014,682 | B2 | * | 3/2006 | Hickerson et al. ................ 95/92 |
| 2007/0156288 | A1 | * | 7/2007 | Wroblewski et al. ......... 700/266 |
| 2009/0314185 | A1 | * | 12/2009 | Whellock ..................... 106/405 |
| 2010/0212550 | A1 | * | 8/2010 | Zhang et al. ................... 106/668 |

* cited by examiner

*Primary Examiner* — Christopher P Jones

(74) *Attorney, Agent, or Firm* — Troutman Sanders, LLP; Ryan A. Schneider; Dustin B. Weeks

(57) ABSTRACT

An exemplary embodiment of the present invention provides an induced-draft injection system comprising an injection line in fluid communication with a duct under negative pressure, a particulate storage containing particulate, and a feeder receiving the particulate from the particulate storage and feeding the particulate to the injection line. The negative pressure in the duct supports the transportation of at least a portion of the particulate through the injection line and into the duct. Inside the duct, a binding portion of the particulate is bound to a portion of mercury in a flue gas passing through the duct, thus enabling a portion of the mercury to be filtered out of the flue gas.

20 Claims, 10 Drawing Sheets

INDUCED-DRAFT INJECTION SYSTEMS AND METHODS

CROSS-REFERENCE TO RELATED APPLICATIONS

This application claims the benefit of U.S. Provisional Application Ser. No. 61/487,064, filed on 17 May 2011, which is incorporated herein by reference in its entirety as if fully set forth below.

TECHNICAL FIELD OF THE INVENTION

The various embodiments of the present disclosure relate generally to injection systems and methods. More particularly, the various embodiments of the present invention are directed to systems and methods for injecting particulate into a duct via an induced-draft.

BACKGROUND OF THE INVENTION

Recently passed laws and regulations, e.g. the Clean Air Act, have placed strict requirements on the amount of mercury that can be emitted into the atmosphere from the boilers of coal-fired electric power generation plants, as well as other industrial plants. Thus, power generation companies have invested millions of dollars in developing new technologies for capturing mercury in the flue gases emitted from power plants. One such technology involves injecting finely ground Powdered Activated Carbon ("PAC") into the flue gas stream. The PAC is a sorbent and can adsorb and absorb a majority of mercury that would otherwise be exhausted into the atmosphere. After the PAC is injected into the flue gas, the flue gas is passed through a baghouse that serves as a large filter to remove the PAC, thus removing the mercury.

Conventional PAC injection systems include a silo, a feeder, an educator, and a blower. PAC is stored in the silo and fed to the educator by the feeder. The educator is powered by the blower, which creates an air stream forcing the PAC through the educator and a piping system, and ultimately into the flue gas stream. Unfortunately, conventional systems employing a blower and educator have many disadvantages, a few of which will be explained. First, the blower and educator are expensive components to install. Second, because the blower must create a powerful air stream to force PAC through the system, from the educator to the flue gas, the blower continually causes damage to the piping system. Thus, under normal circumstances, the piping system must be replaced every two-to-six weeks, which leads to further expenses in materials and labor. Third, because the piping system from a blower must be replaced so frequently, many power plants employ as many as three conventional PAC injection systems per boiler system to ensure that PAC in continuously injected even if one system is down under repair. Fourth, depending on the size of the boiler system, conventional PAC injection systems may require PAC injection rates exceeding 400 pounds per hour, thus creating a need for large silos to store such large amounts of PAC. Because many boiler systems run 24 hours a day, 365 days a year, the cost associated with PAC, not to mention the materials and labor to repair the damaged PAC injection systems, can be tremendous.

Therefore, there is a desire for improved systems and methods for injecting PAC into the flue gas of a boiler system. Specifically, there is a desire for systems and methods for injecting PAC into the flue gas of a boiler system that limits damage to the piping systems and that is capable of decreasing the PAC injection rates (over conventional systems) while maintaining sufficient mercury removal.

BRIEF SUMMARY OF THE INVENTION

The present invention relates to induced-draft injection systems and methods. Various embodiments of the present invention find uses in power generation plants having a boiler with a flue gas and a fan inducing a negative pressure in a duct to transport the flue gas out of the boiler. The flue gas can comprise mercury. An exemplary embodiment of the present invention provides an induced-draft PAC injection system for positioning PAC in contact with at least a portion of the mercury in the flue gas such that at least a binding portion of the PAC binds to at least a portion of the mercury in the flue gas (hereinafter "bound mercury"). The system enables the bound mercury to be filtered out of the flue gas before the flue gas is exhausted.

The system comprises an injection line in fluid communication with the duct, a PAC storage element containing PAC, and a feeder receiving the PAC from the PAC storage element and feeding the PAC to the injection line. The negative pressure in the duct supports the transportation of at least a first portion of the PAC through the injection line and into the duct. Inside the duct, the binding portion of the PAC binds to the at least a portion of the mercury in the flue gas.

In some embodiments present invention, a distribution portion of the injection line comprise a first end, a second end, and at least two distribution ports between the first end and the second end. The distribution ports are in fluid communication with the duct. In some embodiments, the at least two distribution ports have outlets with cross-sectional areas that progressively increase from the distribution port proximate the first end to the distribution port proximate the second end.

In some embodiments of the present invention, an injection portion of the injection line comprises a first end, a second end, and at least two injection ports between the first end and the second end. Each injection port can comprise an outlet in fluid communication with the duct, and a fluid director directing a portion of the at least a first portion of the particulate, such as PAC, through the outlet and into the duct. The fluid director can be in mechanical communication with less than the entire perimeter of the outlet. In some embodiments of the present invention, the outlets of the injection ports have cross-sectional areas that progressively increase from the injection port proximate the first end to the injection port proximate the second end.

In some embodiments of the present invention, a third portion of the injection line comprises a pressure relief subsystem providing fluid communication between the injection line and a relief source when pressure in the injection line is below a relief threshold, i.e. the draft through the injection line is too forceful. In an exemplary embodiment, the relief source is ambient air.

In another exemplary embodiment of the present invention, the system comprises a blower providing a stream that aids transportation of particulate, such as PAC, through the injection line, and into the duct, when pressure in the injection line is above a draft-injection threshold, i.e. the draft through the injection line is too weak.

In still another exemplary embodiment of the present invention, the system comprises a debris removal subsystem in fluid communication with the injection line. The debris removal subsystem can have a draft from the injection line for limiting debris from accumulating when the particulate, such as PAC, is fed to the injection line by the first feeder.

Yet another exemplary embodiment of the present invention provides an induced-draft injection system to reduce the amount of an unwanted species, the system comprising a first feeder storing a species-removing substance, an injection line in fluid communication with the first feeder, and a duct under negative pressure in fluid communication with the injection line. The duct can be in fluid communication with an effluent containing an unwanted species. The negative pressure in the duct can support the transportation of at least a first portion of the species-removing substance fed from the first feeder through the injection line and into the duct in order to position a bonding portion of the at least a first portion of the species-removing substance in contact with the unwanted species in the effluent. In an exemplary embodiment of the present invention, the species-removing substance comprises PAC, the unwanted species comprises mercury, and the effluent comprises flue gas.

Still yet another exemplary embodiment of the present invention provides a method of injecting a substance into a duct. The method comprises inducing a negative pressure in a duct, feeding the substance to an injection line, and transporting at least a portion of the substance through the injection line and into the duct using the negative pressure in the duct. In some embodiments of the present invention, the method further comprises providing fluid communication between the injection line and a relief source to increase pressure in the injection line when the pressure is below a relief threshold. In some embodiments of the present invention, the method further comprises blowing a portion of the substance through the injection line and into the duct with a blower when pressure in the injection line is above a draft-injection threshold.

In a power generation plant having an induced-draft fan inducing a negative pressure in a duct to transport a flue gas out of a boiler, the flue gas comprising mercury, and the power generation plant having a blower to introduce PAC into the flue gas at a first injection rate in order to provide a limited mercury concentration in exhausted flue gas, wherein the induced-draft fan is not utilized in the transportation of PAC through an injection line and into the duct, an exemplary embodiment of the present invention provides an improved method of reducing the amount of mercury in the flue gas, comprising utilizing the negative pressure in the duct to support the transportation of powdered activated carbon through the injection line and into the duct to achieve the same amount of limited mercury concentration in exhausted flue gas as the conventional system. In some embodiments of the present invention, the improved method has a second injection rate that is at most 75% of the first injection rate. In some embodiments of the present invention, the improved method has a second injection rate that is at most 50% of the first injection rate. In some embodiments of the present invention, the improved method has a second injection rate that is at most 30% of the first injection rate.

These and other aspects of the present invention are described in the Detailed Description below and the accompanying figures. Other aspects and features of embodiments of the present invention will become apparent to those of ordinary skill in the art, upon reviewing the following description of specific, exemplary embodiments of the present invention in concert with the figures. While features of the present invention may be discussed relative to certain embodiments and figures, all embodiments of the present invention can include one or more of the features discussed herein. While one or more embodiments may be discussed as having certain advantageous features, one or more of such features may also be used with the various embodiments of the invention discussed herein. In similar fashion, while exemplary embodiments may be discussed below as system or method embodiments, it is to be understood that such exemplary embodiments can be implemented in various devices, systems, and methods of the present invention.

BRIEF DESCRIPTION OF THE DRAWINGS

The following Detailed Description of the Invention is better understood when read in conjunction with the appended drawings. For the purposes of illustration, there is shown in the drawings exemplary embodiments, but the subject matter is not limited to the specific elements and instrumentalities disclosed.

DETAILED DESCRIPTION OF THE INVENTION

To facilitate an understanding of the principles and features of the present invention, various illustrative embodiments are explained below. In particular, the invention is described in the context of being induced-draft injection systems and methods. Embodiments of the present invention may be applied to systems or methods for injecting particulate into a duct. Embodiments of the invention, however, are not limited to use in systems and methods for injecting particulate into the duct of a boiler in a power generation plant, as described herein. As those of ordinary skill in the art would understand, embodiments of the invention provide systems or methods for injecting a particulate into a duct, or other device under negative pressure, in many different environments, including, but not limited to, boilers, solid waste incinerators, cement or concrete plants, paper mills, and many other industrial applications.

The components described hereinafter as making up various elements of the invention are intended to be illustrative and not restrictive. Many suitable components or steps that would perform the same or similar functions as the components or steps described herein are intended to be embraced within the scope of the invention. Such other components or steps not described herein can include, but are not limited to, for example, similar components or steps that are developed after development of the invention.

Some embodiments of the present invention may greatly benefit the power generation industry, particularly coal-fired power generation plants. A typical coal-fired power generation plant operates by burning coal in a boiler to heat water, which generates steam to rotate a turbine. Burning the coal in the boiler generates a flue gas. An induced-draft fan is used to pull the flue gas out of the boiler and through a duct where the flue gas is eventually emitted or exhausted into the atmosphere. Unfortunately, the flue gas contains gaseous mercury that must be removed from the flue gas before the flue gas is exhausted into the atmosphere. PAC is a particulate that can bind to and adsorb or absorb the gaseous mercury molecules in the flue gas. Thus, PAC is typically injected into the duct carrying the flue gas so that it binds to the mercury molecules in flue gas. The flue gas is then transported through a filter device, such as a baghouse, that removes the PAC, and thus the mercury, from the flue gas.

In conventional PAC injection systems, PAC is typically stored in a silo. A feeder feeds PAC from the silo to the intake of an educator. A blower is used to generate an air stream through the educator that pulls the PAC through the educator and blows it through a piping system and into the duct. Unfortunately, as discussed above, continued use of the blower causes a lot of damage to the piping system, which requires continuous and costly maintenance and repairs.

Figure 1:
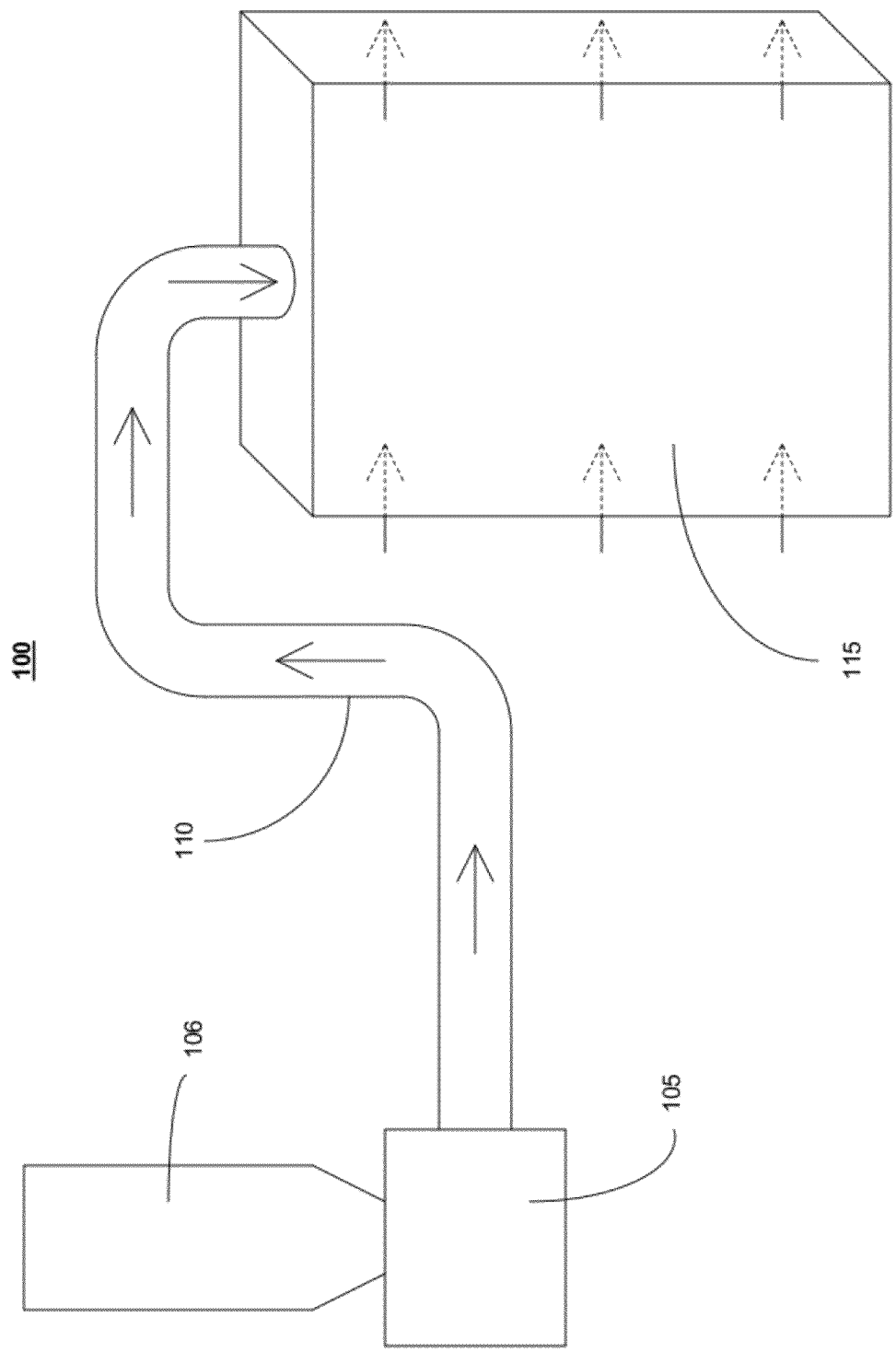
FIG. 1 provides an illustration of an induced-draft injection system in accordance with an exemplary embodiment of the present invention.

An exemplary embodiment of the present invention provides an improved PAC injection system for positioning PAC in contact with at least a portion of the mercury (the system does not always reach every mercury molecule) in a flue gas such that at least a binding portion of the PAC (every particle of PAC does not always bind to a mercury molecule) binds to a portion of the mercury in the flue gas, thus enabling the bound mercury to be filtered out of the flue gas. As illustrated in FIG. 1, an exemplary induced-draft PAC injection system 100 comprises a PAC storage element 106, a first feeder 105, and an injection line 110. The injection line 110 is in fluid communication with a duct 115, wherein the duct 115 is under a negative pressure. The negative pressure in the duct 115 creates a draft through the injection line 110 and to the duct 115. As used herein, negative pressure means pressure less than atmospheric pressure. In an exemplary embodiment of the present invention, the duct 115 is in fluid communication with an induced-draft fan, wherein the inducted-draft fan creates the negative pressure in the duct 115 by pulling air out of the duct 115. The first feeder 105 receives PAC from the PAC storage element 106 and feeds the PAC to the injection line 110. In an exemplary embodiment of the present invention, the PAC storage element 106 is a silo. The negative pressure in the duct 115, by creating the draft through the injection line 110, supports the transportation of at least a first portion of the PAC through the injection line 110 and into the duct 115. Inside the duct 115, the binding portion of the mercury can be bound to the at least a portion of the mercury. Thus, the bound mercury can then be filtered out of the flue gas.

The injection line 110 of the present invention can comprise many devices, elements, or systems for providing fluid communication between one or more feeders and a duct 115, including, but not limited to, a piping system, a ductwork, and the like, or any combination thereof. In an exemplary embodiment of the present invention, the injection line 110 comprises a piping system. The duct 115 of the present invention can comprise many devices, element, or systems for transporting a fluid, including, but not limited to, a piping system, ductwork, and the like, or any combination thereof.

The scope of the present invention is not limited, however, to injecting PAC into a duct 115 to reduce the amount of mercury in a flue gas. Instead, embodiments of the present invention may be used to inject many different particulates into a duct 115. Further, embodiments of the present invention may be used to remove many unwanted species. Thus, an exemplary embodiment of the present invention provides an induced-draft injection system to reduce the amount of an unwanted species. The system comprises a first feeder 105 storing a species-removing substance, an injection line 110 in fluid communication with the first feeder 105, and a duct 115 under a negative pressure and in fluid communication with the injection line 110. The duct 115 is in fluid communication with an effluent with an unwanted species. The first feeder 105 feeds the species-removing substance to the injection line 110. The negative pressure in the duct 105 supports the transportation of at least a portion of the species-removing substance through the injection line 110 and into the duct 115 in order to position a binding portion of the species-removing substance in contact with the unwanted species. In an exemplary embodiment of the present invention, the unwanted species comprises mercury. In another exemplary embodiment of the present invention, the unwanted species comprises sulfur. In yet another exemplary embodiment, the species-removing substance is PAC. In still yet another exemplary embodiment of the present invention, the effluent is a flue gas from a boiler.

Figure 3:
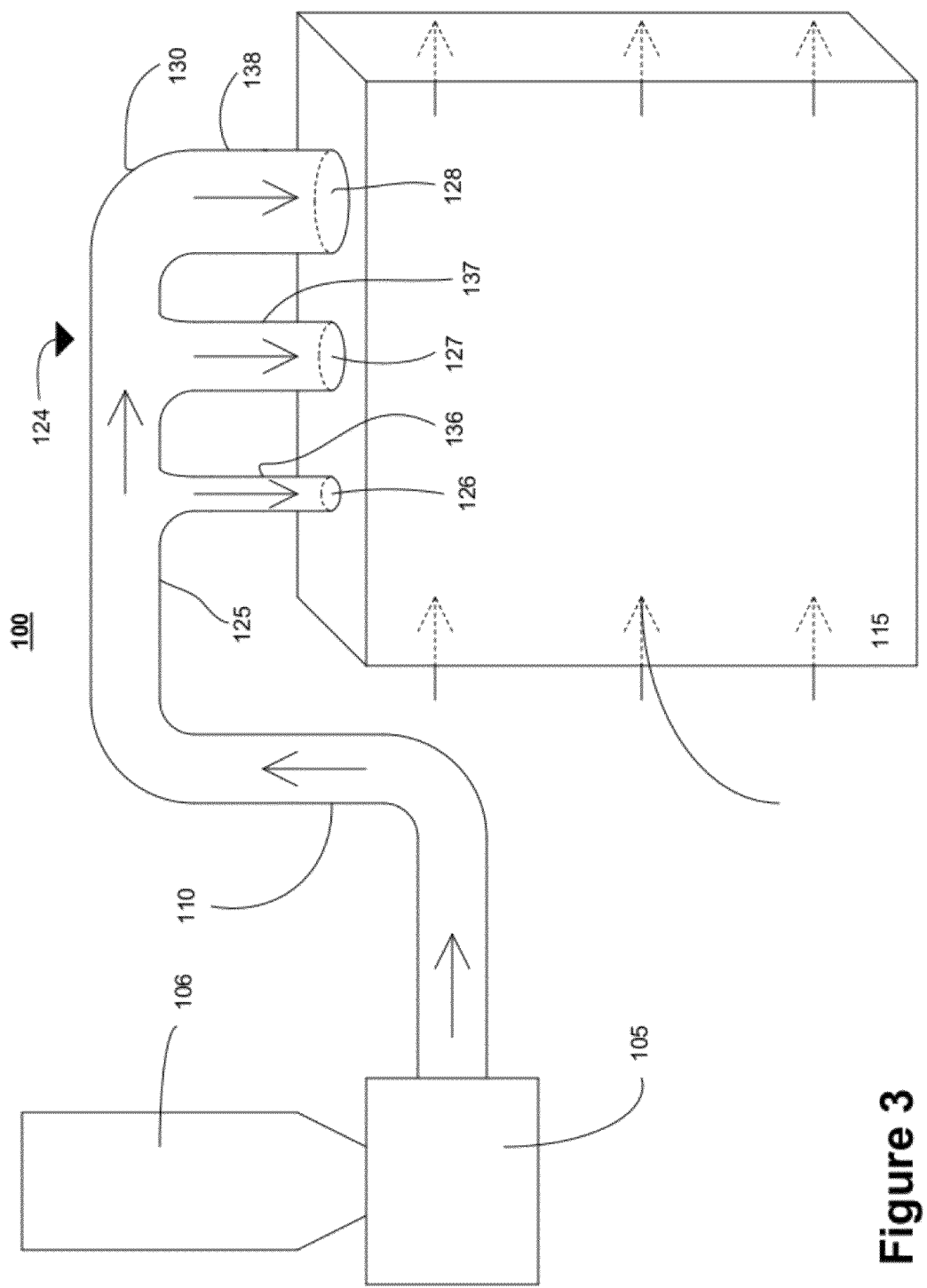

As shown in FIG. 3, in an exemplary embodiment of the present invention, a distribution portion of the injection line 110 comprises a distribution header 124. The distribution header 124 comprises a first end 125, a second end 130, and at least two distribution ports 136, 137, and 138 between the first end 125 and the second end 130. Each distribution port 136, 137, and 138 is in fluid communication with the duct 115, such that the draft in the injection line 110 passes through the distribution header 124 and the distribution ports 136, 137, and 138 before entering the duct 115. In some embodiments of the present invention, the distribution ports 136, 137, and 138 have outlets 126, 127, and 128 with cross-sectional areas that progressively increase from the distribution port proximate the first end 136 to the distribution port proximate the second end 138. In embodiments of the present invention where the distribution ports 136, 137, and 138 have progressively larger outlets 126, 127, and 128 to the duct 115, the distribution header 124 allows a more equal amount of particulate to enter the duct 115 via each distribution port 136, 137, and 138 than when the outlets 126, 127, and 128 have substantially identical cross-sectional areas. If the particulate is PAC, then when a similar amount of PAC enters the duct 115 via each distribution port 136, 137, and 138, the PAC can be more spread throughout the duct 115 and more evenly exposed to the flue gas, than if more PAC enters through one distribution port than another.

Figure 4:
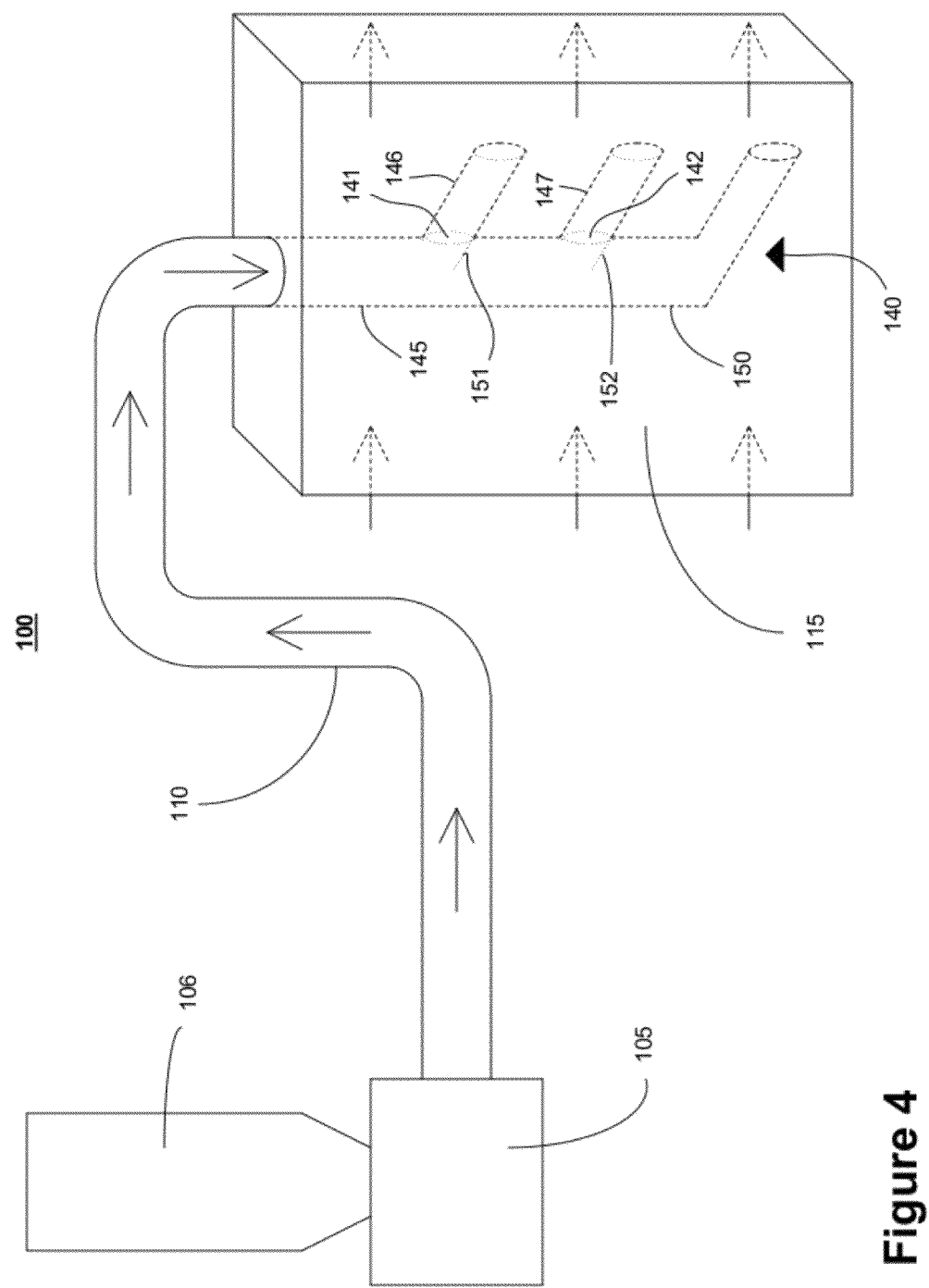
Figure 6:
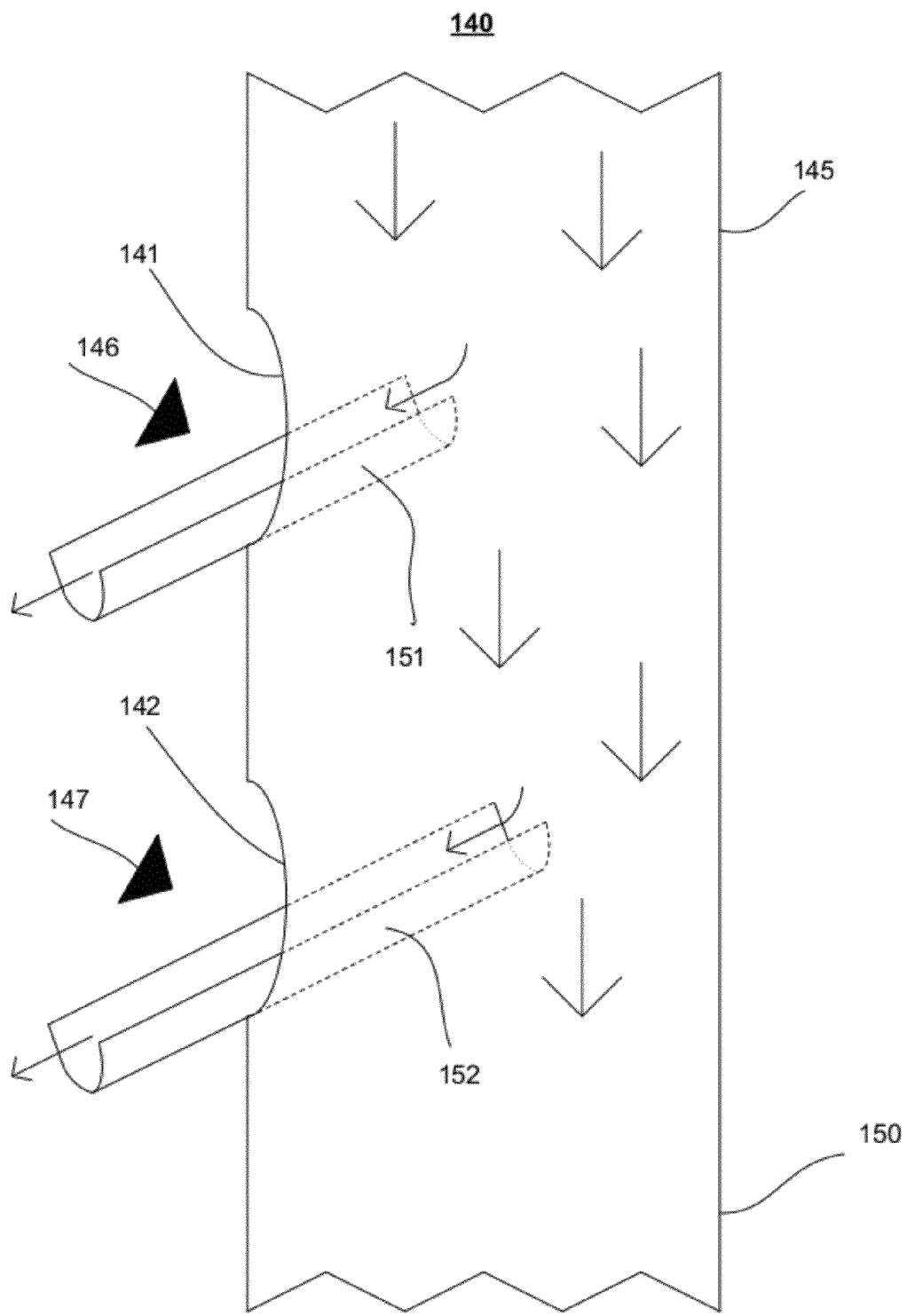

As shown in FIG. 4, in another exemplary embodiment of the present invention, an injection portion of the injection line 110 comprises an injection header 140. The injection header 140 comprises a first end 145, a second end 150, and at least two injection ports 146 and 147 between the first end 145 and the second end 150. Each injection port 146 and 147 is in fluid communication with the duct 115, such that the draft of the injection line 110 passes through the injection header 140 and injection ports 146 and 147 before entering the duct 115. In an exemplary embodiment of the present invention, each injection port 146 and 147 comprises an outlet 141 and 142 in fluid communication with the duct 115 and a fluid director 151 and 152 in mechanical communication with less than the entire perimeter of the outlet 141 and 142, as shown in FIG. 6. Although the fluid directors 151 and 152 shown in FIG. 6 are curved, those skilled in the art would recognize that the fluid directors 151 and 152 may be many shapes, which are included within the scope of the present invention. The fluid directors 151 and 152 can be perpendicular to the outlets 141 and 142, or, as depicted in FIG. 6, the fluid directors 151 and 152 can be positioned at an angle with respect to the outlets 141 and 142.

As illustrated by arrows in FIG. 6, each fluid director 151 and 152 directs a portion of the particulate flowing through the injection line 110 through the injection ports 146 and 147 and into the duct 115. In conventional systems, a tube in communication with the entire perimeter of the injection port was used to direct PAC into the duct. These systems presented many problems. Specifically, particulate material would build up on the outside of the tube, thus preventing injection into the duct and eventually clogging up the piping system. An exemplary embodiment of the present invention addresses this problem by using fluid directors 151 and 152—instead of tube—wherein the fluid directors 151 and 152 are in communication with less than the entire perimeter of the outlets 141 and 142. As illustrated in FIG. 6, in an exemplary embodiment of the present invention, a portion of the fluid directors 151 and 152 extend outward from the outlets 141 and 142 of the injection header 140 and into the duct 115. As shown in FIG. 4, in another exemplary embodiment of the present invention, the fluid directors 151 and 152 do not extend outward from the outlets 141 and 142 into the duct; instead, tubes, or other members, extend outward from the outlets 141 and 142 and into the duct 115. In an exemplary embodiment, the tubes, or other members, are in mechanical communication with the entire perimeter of the outlets 141 and 142.

In yet another exemplary embodiment of the present invention, the injection ports 146 and 147 have outlets 141 and 142 with cross-sectional areas that progressively increase from the injection port proximate the first end 146 to the injection port proximate the second end 147. In embodiments of the present invention where the injection ports 146 and 147 have progressively larger outlets 141 and 142, the injection header 140 allows a more equal amount of particulate to enter the duct 115 via each injection port 146 147 than when the outlets 141 and 142 have substantially identical cross-sectional areas. If the particulate material is PAC, then when a similar amount of PAC enters the duct 115 via each injection port in the plurality of injection ports 146 and 147, the PAC is more spread throughout the duct 115 and more evenly exposed to the flue gas, than if more PAC enters through one injection port than another.

As shown in FIG. 4, to better distribute the particulate material through the duct, in some embodiments of the present invention, the injection header 140 is located substantially within the duct 115. Additionally, some embodiments of the present invention comprise a plurality of injection headers. Each injection header 140 in the plurality of injection headers can be in fluid communication with a different distribution port 136, 137, and 138 from the distribution header. Further, the plurality of injection headers can be located substantially within the duct 115. Although not shown in the Figures, in some embodiments of the present invention, the injection line 110 comprises multiple distribution headers. Each distribution port in the multiple distribution headers can be in fluid communication with separate injection header, thus improving the distribution of particulate throughout the duct and improving the portion of an unwanted species, such as mercury, that will come in contact with the particulate.

Figure 2:
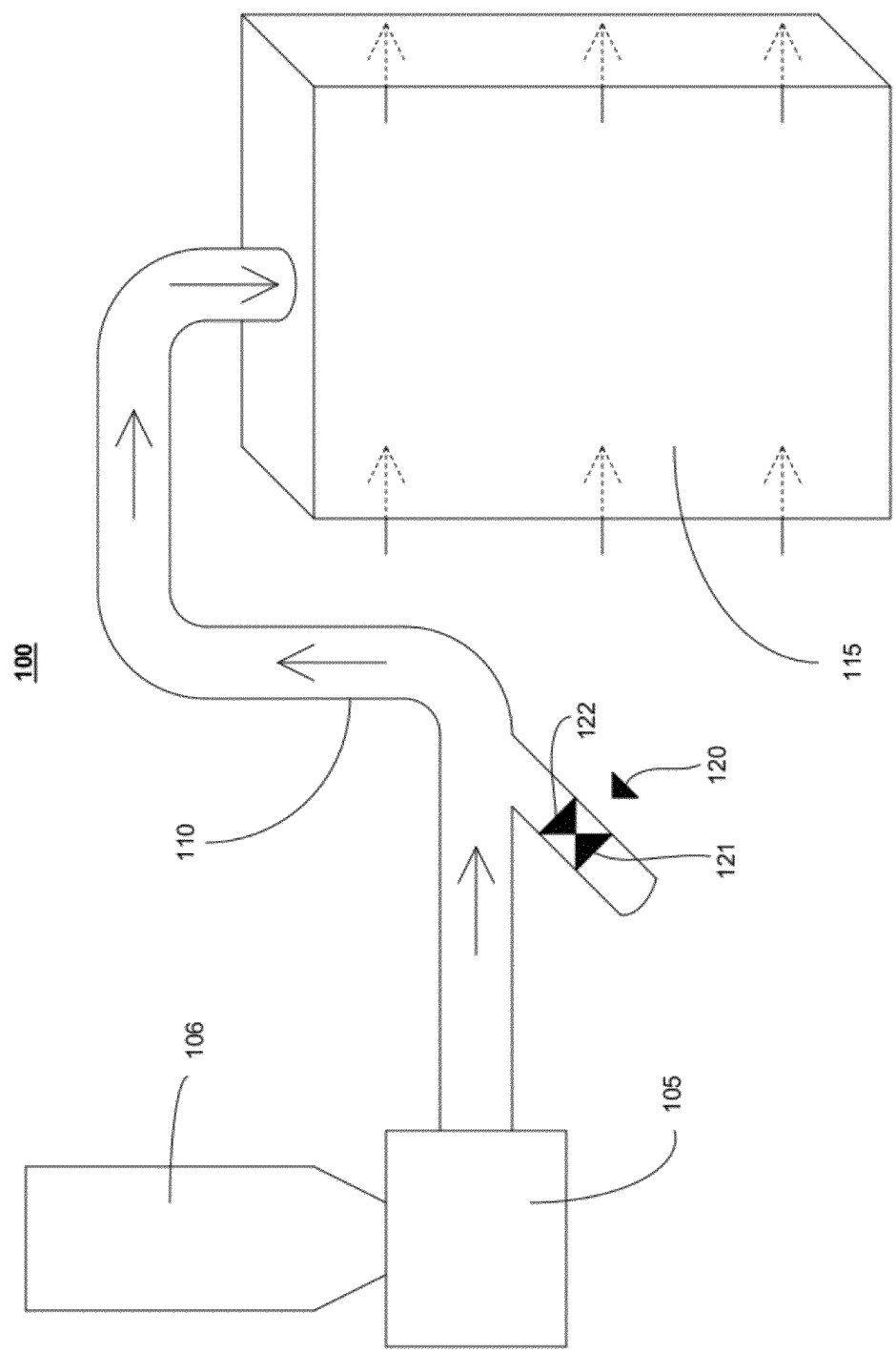
FIG. 2 provides a an illustration of an induced-draft injection system comprising a pressure relief subsystem in accordance with an exemplary embodiment of the present invention FIG. 3 provides an illustration of an induced-draft injection system comprising a distribution header in accordance with an exemplary embodiment of the present invention FIG. 4 provides an illustration of an induced-draft injection system comprising an injection header in accordance with an exemplary embodiment of the present invention.

As shown in FIG. 2, in another exemplary embodiment of the present invention, a third portion of the injection line 110 comprises a pressure relief subsystem 120. The pressure relief subsystem 120 provides fluid communication between the injection line 110 and a relief source when pressure in the injection line 110 is below a relief threshold, i.e. the strength of the draft through the injection line is too strong. The relief threshold can be many different values and can be chosen based on the particular application of the invention. In an exemplary embodiment the relief source in ambient air. The relief subsystem 120 can be many relief subsystems known to those skilled in the art. In exemplary embodiment of the present invention, the relief subsystem comprises a valve having an inlet 121 and an outlet 122. The inlet 121 is in fluid communication with the relief source and the outlet 122 is in fluid communication with the injection line 110. When the pressure in the injection line 110 is below a relief threshold, the valve opens to provide fluid communication between the inlet 121 and outlet 122, thus providing fluid communication between relief source and the injection line 110 to increase the pressure in the injection line 110, i.e. reduce the strength of the draft in the injection line 110.

Figure 5:
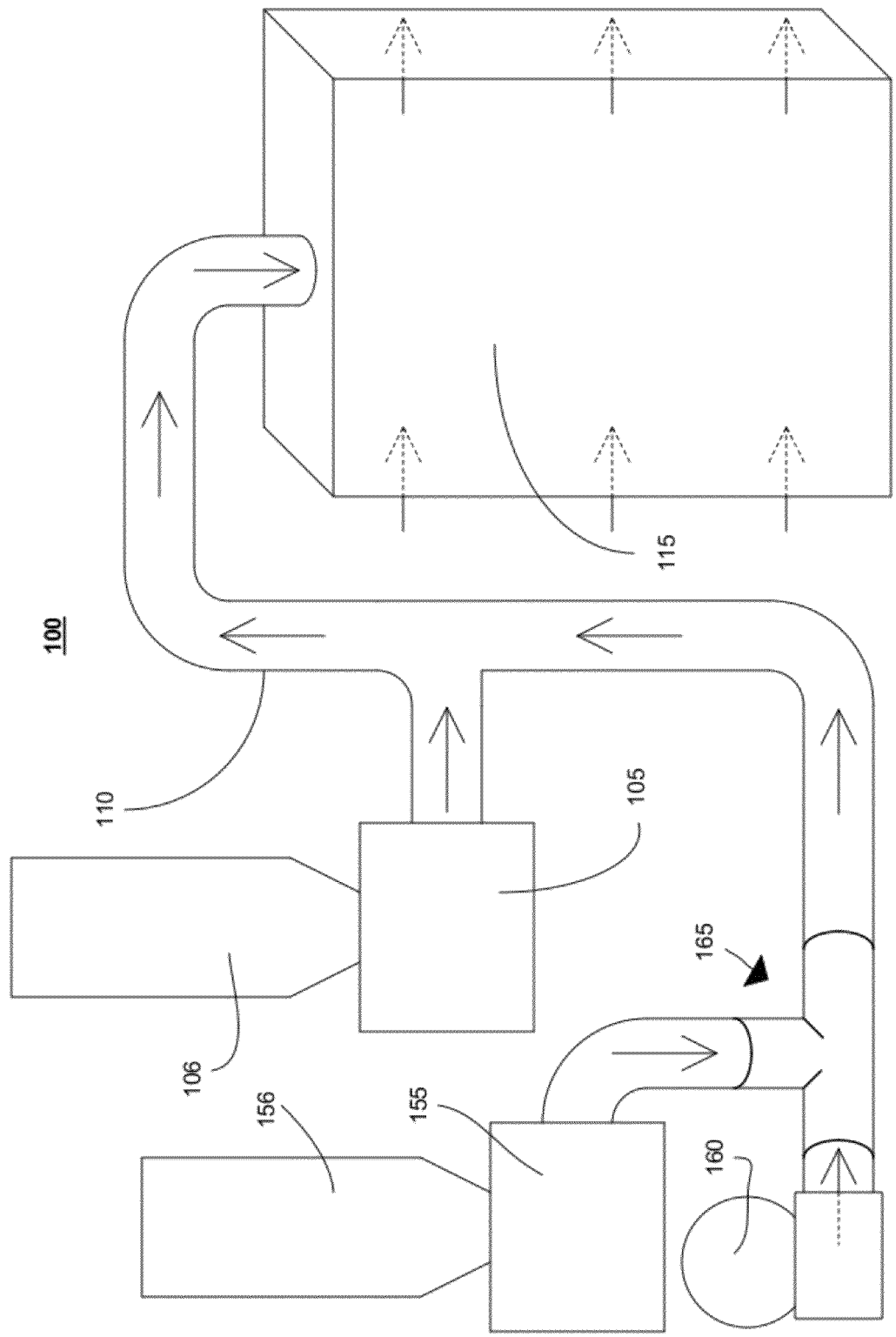
FIG. 5 provides an illustration of an induced-draft injection system comprising a blower and a second feeder in accordance with an exemplary embodiment of the present invention FIG. 6 provides an illustration of an injection header in accordance with an exemplary embodiment of the present invention.

As shown in FIG. 5, in another exemplary embodiment of the present invention, the induced-draft injection system 100 further comprises a blower 160 providing an air stream that blows particulate from a second feeder 155, through the injection line 110, and into the duct 115, when the pressure in the injection line 110 is above a draft-injection threshold, i.e. the strength of the draft is too weak. In some embodiments, the blower 160 comprises a fan or other element generating an air stream. The air stream is used to force particulate from the second feeder 155 through an educator 165, through the injection line 110, and into the duct 115. In an exemplary embodiment of the present invention, the injection system comprises one or more pressure transducers that sense when the pressure in the injection line 110 and/or duct 115 is above the draft-injection threshold, thus activating the blower 160 and second feeder 155. The one or more pressure transducers can be positioned at various locations of the system, including, but not limited to, the injection line 110 and/or the duct 115. These embodiments may be helpful in ensuring sufficient injection rates of particulate when the pressure in the injection line 110 is above the draft-injection threshold. For example, during the start-up of a boiler system, the induced-draft fan may not be running at full load, such that the pressure in the duct 115 is not very low and the draft through the injection line 110 is too weak to sustain sufficient injection rates of PAC. In this situation, the blower 160 and second feeder 155 can be activated to ensure that sufficient amounts of PAC is injected into the duct 115 until the draft is strong enough to sustain sufficient injection rates. In an exemplary embodiment of the present invention, the blower 160 and second feeder 155 are deactivated, i.e. no longer transmit particulate to the injection line 110, injection line 110 and/or duct 115 is below the draft injection threshold, i.e. the draft is strong enough to sustain sufficient particulate injection without the blower 160 and second feeder 155.

Figure 8:
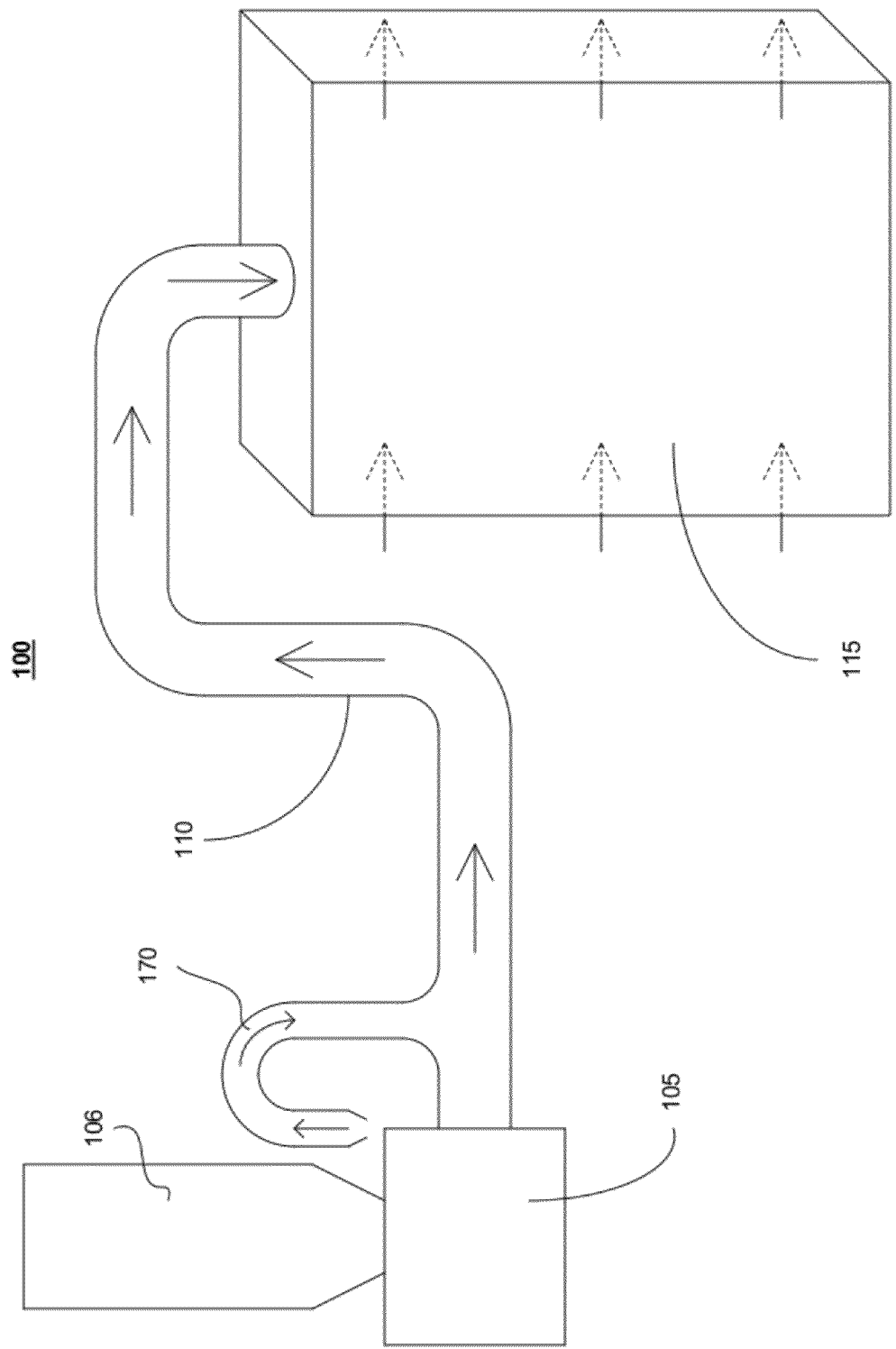
FIG. 8 provides an illustration of an induced-draft injection system comprising a debris removal subsystem in accordance with an exemplary embodiment of the present invention.
Figure 9:
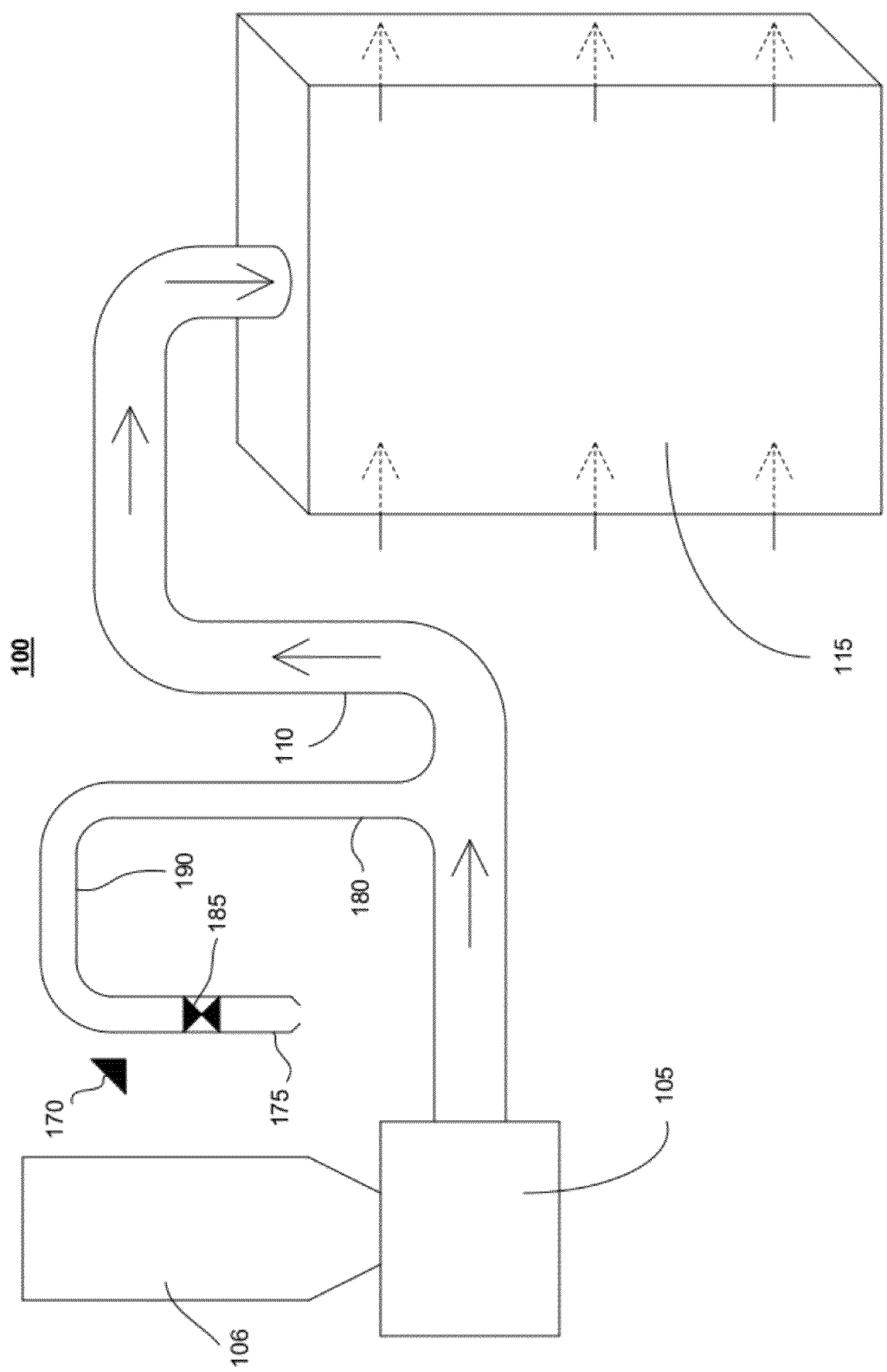
FIG. 9 provides an illustration of an induced-draft injection system comprising a debris removal subsystem with a portable vacuum line in accordance with an exemplary embodiment of the present invention FIG. 10 provides a schematic diagram of an induced-draft injection system in accordance with an exemplary embodiment of the present invention.

In some conventional PAC injection systems, filling the hopper at the base of the silo with PAC generates a large amount dust and other debris around the feeder. Some conventional systems use a filter bag to collect all of the dust that accumulates. The filter bag, however, eventually fills up and will stop up the system if it is not changed regularly. Therefore, as shown in FIG. 8, an exemplary embodiment of the present invention provides a debris removal subsystem 170. The debris removal subsystem 170 is in fluid communication with the injection line 110, thus having a draft through the debris removal subsystem 170 and into the injection line 110. Therefore, in some embodiments of the present invention, the debris removal subsystem 170 limits the accumulation of debris when particulate is being transported to the feeder 105. The debris removal subsystem 170 can use the vacuum created by the draft to remove any accumulated debris and inject the debris into the injection line 110 and eventually the duct 115. In an exemplary embodiment of the present invention, the debris removal subsystem 170 is permanently located/fixed in proximity to the feeder 105 and continually used to remove debris or other dust. As shown in FIG. 9, in another exemplary embodiment, the debris removal subsystem 170 comprises a portable vacuum line 190 and a valve 185. The portable vacuum line 190 comprises a first end 180 in fluid communication with the injection line 110 and a second end 175 that can be carried by a user. Thus, the portable vacuum line 190 can comprise a flexible material, allowing substantially free movement of the second end 175. When the valve 185 is in the open position, a draft is created from the second end 175, through the portable vacuum line 190 and into the injection line 110. When the valve 185 is in the closed position the draft is prevented such that the first 180 and second ends 175 of the portable vacuum line 190 are no longer in fluid communication. Thus, a user can pick up the second end 175, open the valve 185, and carry the second end 175 around a workspace to remove debris located therein.

Figure 10:
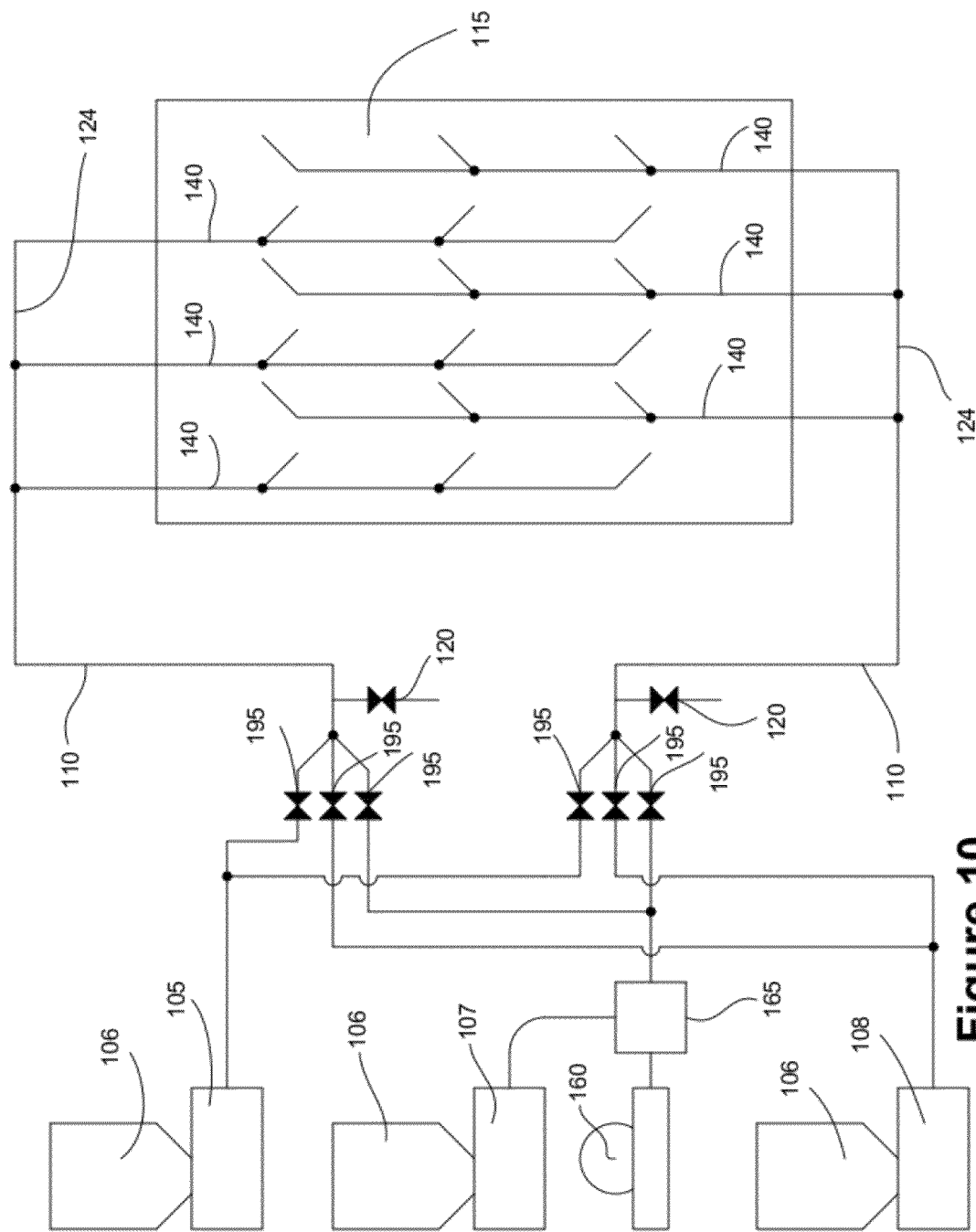

Exemplary injection systems of the present invention may comprise one or more feeders, one or more blowers, one or more pressure relief subsystems, one or more distribution headers, one or more injection headers, or any combination thereof. FIG. 10 provides a schematic diagram of an exemplary injection system of the present invention that comprises three feeders 105, 107, and 108, a blower 160, two distribution headers 124, six injection headers 140, and two relief subsystems 120. In the exemplary injection system, one of more feeders may operate at given time to feed particulate to the injection line. The system comprises a plurality of valves 195, such that an operator can open and close a combination of the valves 195 to determine which combination of feeders 105, 107, and 108 and/or blower 160 are used to inject particulate into the duct 115. In some embodiments of the present invention, the system comprises valves 195 and piping allowing particulate from one or more of the feeders 105, 107, and 108 to be injected into the duct 115 via each of one or more injection lines 110. In an exemplary embodiment, the valves 195 are automatic valves that can be controlled by a remote operating system. Although FIG. 10 depicts a separate particulate storage element 106 for each feeder 105, 107, and 108, in some embodiments of the present invention, a single particulate element 106 can be used to provide particulate to each of the feeder 105, 107, and 108.

Figure 7:
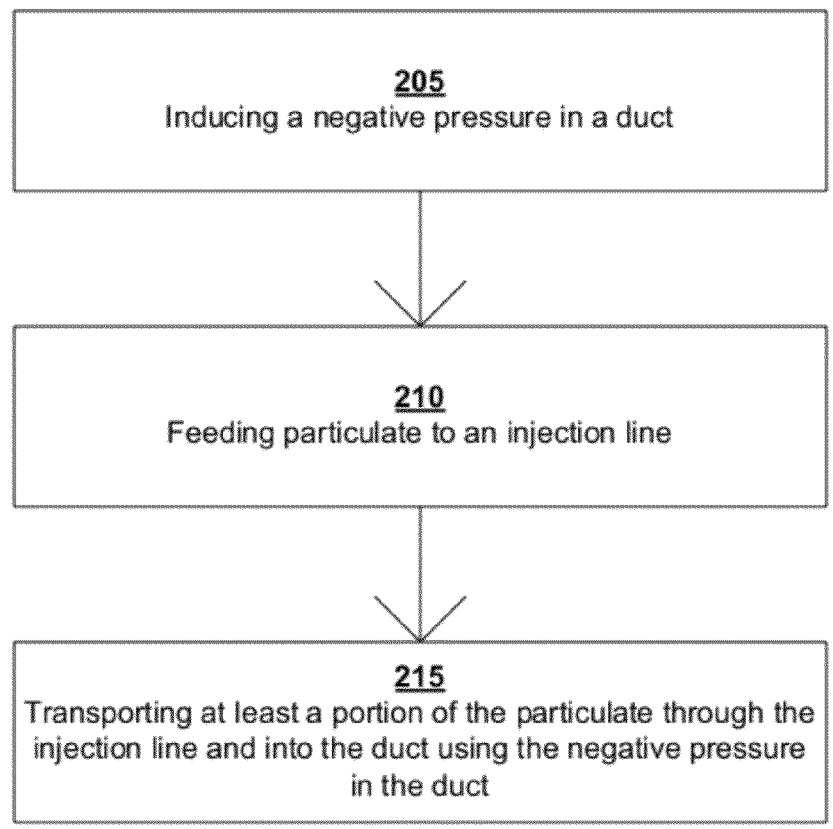
FIG. 7 provides a block diagram of a method of injecting particulate into a duct in accordance with an exemplary embodiment of the present invention.

In addition to induced-draft injection systems, various embodiments of the present invention provide methods of injecting a substance into a duct 200. FIG. 7 provides a block diagram of a method of injecting a substance into a duct 200 in accordance with an exemplary embodiment of the present invention. The method comprises inducing a negative pressure in a duct 205, feeding the substance to an injection line 210, and transporting at least a portion of the substance through the injection line and into the duct using the negative pressure in the duct 215. The substance can be a solid, liquid, or gaseous substance. In an exemplary embodiment of the method 200, the substance is PAC. In another exemplary embodiment, the step of inducing a negative pressure in the duct 205 comprises activating an induced-draft fan, which pulls air out of the duct.

In an exemplary embodiment of the present invention, the method 200 further comprises increasing the pressure in the injection line 110 when the pressure is below a threshold. In some embodiments, the step of increasing the pressure in the injection line 110 comprises providing fluid communication between the injection line 110 and a relief source. In some embodiments of the present invention, a pressure relief subsystem 120 is used to provide fluid communication between the injection line 110 and the relief source. In some embodiments of the present invention, the relief source is ambient air. Thus, if the pressure in the injection line 110 is below a threshold, i.e. the draft is too strong, the pressure relief subsystem 120 can allow ambient air to enter the injection line 110, and thus increase the pressure, i.e. reduce the strength of the draft.

As discussed above, during start-up of a boiler system, because the induced-draft fan is not running at full load, the draft through the injection line 110 may be too weak to sufficiently inject PAC into the duct. Therefore, in an exemplary embodiment of the present invention, the method of injecting a substance into the duct 200 further comprises blowing a portion of the substance through the injection line 110 and into the duct 115 with a blower 160 when pressure in the injection line 110 is above a draft-injection threshold. Thus, during start-up, or another time when the draft of too weak, i.e. the pressure in the injection line is above a draft-injection threshold, a blower 160 may be used to blow the substance through the injection line 110 and into the duct 115.

Further, as discussed above, debris can accumulate around the feeder of a PAC injection system due to dust created by filling the hopper below a PAC silo. Moreover, filter bags of conventional systems which capture the dust and debris can clog and shut down the system if they are not changed regularly. Therefore, in an exemplary embodiment of the present invention, the method of injecting a substance into a duct further 200 comprises removing debris around the feeder 105 using the draft from the injection line 110. In some embodiments the debris is removed using a debris removal subsystem having a draft from the injection line 110.

Embodiments of the present invention provide significant improvement over conventional systems. This is especially true in the field of power generation, where PAC is used to remove mercury from the exhaust gas or flue gas of a boiler. Embodiments of the present invention provide for enhanced mercury capture, lower PAC injection rates, and decreased maintenance costs. For example, for an 880 megawatt power generation unit, conventional PAC injection systems, which employed blower systems, require monthly maintenance to replace the piping system from the blower to an injection line. This is the result of erosion caused by the high powered blower forcing PAC through the piping system. The annual costs of repairing these conventional blower PAC injection systems exceed $150,000. Conversely, by eliminating the constant need for the harmful blower system, embodiments of the present invention require little, if any, annual maintenance, thus resulting in drastic savings in labor and materials.

While the reduction in damage to the piping system provided by embodiments of the present invention was expected, the amount of PAC needed to adequately remove mercury unexpectedly and drastically decreased. Conventional PAC injection systems require an 880 megawatt unit to inject PAC at a rate of 400 pounds of PAC per hour to reduce mercury emissions to 1.45 parts per million ("ppm"). Significantly, embodiments of the present invention may reduce PAC injection rates to 105 pounds of PAC per hour while still reducing mercury emission to 0.96 ppm. Thus, some embodiments of the present invention can use almost 75% less PAC than conventional systems while achieving mercury emission rates that are 35% lower than the conventional systems. To put this into perspective, for a unit running 24 hours a day and 365 days per year, embodiments of the present invention reduce the annual amount of PAC used by over 2.6 million pounds per unit, all while lowering the amount of mercury emitted into the atmosphere. This is a staggering number, especially because many power generation plants comprise multiple power generation units. One reason for the decreased amount of PAC needed to achieve similar mercury concentration emissions is the decreased temperature of the PAC entering the duct. The blower in conventional systems heated the PAC during the injection process. Because some embodiments of the present invention no longer use a blower during the injection process, the PAC is not heated prior to entering the duct, and thus exhibits improved binding (adsorbing and absorbing) characteristics.

Conventional power plants have a blower to introduce PAC into a flue gas at a first injection rate (amount of PAC per unit of time) in order to provide a limited mercury concentration in exhausted flue gas (flue gas emitted into the atmosphere). The conventional power plants do not, however, utilize an induced-draft fan or negative pressure in the duct during the transportation of PAC through an injection line and into the duct. An exemplary embodiment of the present invention provides an improved method of method of reducing the amount of mercury in a flue gas. The improved method of the present invention comprises utilizing the negative pressure in the duct to support the transportation of PAC through the injection line and into the duct to achieve no greater limited mercury concentration in the exhausted flue gas than the conventional method. In an exemplary embodiment of the present invention, the improved method has a second injection rate that is at most 75% of the first injection rate. In another exemplary embodiment of the present invention, the improved method has a second injection rate that is at most 50% of the first injection rate. In yet another exemplary embodiment of the present invention, the improved method has a second injection rate that is at most 30% of the first injection rate.

In addition to decreased costs in PAC, embodiments of the present invention provide decreased costs in materials for PAC injection systems. Specifically, embodiments of the present invention allow PAC storage silos to be much smaller, due to the fact that not nearly as much PAC is injected into the ducts. Additionally, some embodiments of the present invention no longer require expensive blower systems. Moreover, while conventional PAC injection systems often require as many as three feeders and blowers to inject PAC, due to one or more often being repaired, some embodiments of the present invention no longer require back-up feeders, or any blowers, because the systems rarely need maintenance. Thus, while conventional PAC injection systems may costs upwards of $45 million, embodiments of the present invention allow PAC injection systems to be installed for less than $30 million—a savings of over $15 million per unit.

It is to be understood that the embodiments and claims disclosed herein are not limited in their application to the details of construction and arrangement of the components set forth in the description and illustrated in the drawings. Rather, the description and the drawings provide examples of the embodiments envisioned. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

Furthermore, the purpose of the foregoing Abstract is to enable the International Receiving Office and the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way. It is intended that the application is defined by the claims appended hereto.

What is claimed is:

1. In a power generation plant having a boiler with a flue gas in a duct at a negative pressure to transport the flue gas out of the boiler, the flue gas comprising mercury, an induced-draft powdered activated carbon ("PAC") injection system for positioning PAC in contact with at least a portion of the mercury in the flue gas such that a binding portion of PAC binds to the at least a portion of the mercury, enabling the bound mercury to be filtered out of the flue gas before the flue gas is exhausted, the induced-draft PAC injection system comprising:
an injection line in fluid communication with the duct;
a PAC storage element containing a plurality of PAC; and
a feeder configured to receive the PAC from the PAC storage element and feed the PAC to the injection line;
wherein the negative pressure in the duct induces a negative pressure in the injection line to support the transportation of at least a first portion of PAC through the injection line and into the duct.

2. The induced-draft PAC injection system of claim 1, wherein the injection line comprises a distribution portion including:
a first end;
a second end; and
at least two distribution ports between the first end and the second end in fluid communication with the duct, the at least two distribution ports having outlets with cross-sectional areas that progressively increase from the distribution port proximate the first end to the distribution port proximate the second end.

3. The induced-draft PAC injection system of claim 1, wherein the injection line comprises an injection portion including:
a first end;
a second end; and
at least two injection ports between the first end and the second end, each injection port comprising:
an outlet in fluid communication with the duct; and
a fluid director configured to direct a portion of the at least a first portion of PAC through the outlet and into the duct, the fluid director in mechanical communication with less than an entire perimeter of the outlet.

4. The induced-draft PAC injection system of claim 1, wherein the injection line comprises an injection portion including:
a first end;
a second end; and at least two injection ports between the first end and the second end in fluid communication with the duct, the at least two injection ports having outlets with cross-sectional areas that progressively increase from the injection port proximate the first end to the injection port proximate the second end.

5. The induced-draft PAC injection system of claim 1, wherein a portion of the injection line comprises a pressure relief subsystem providing fluid communication between the injection line and a relief source when pressure in the injection line is below a relief threshold.

6. The induced-draft PAC injection system of claim 1, further comprising a blower providing a stream that aids transportation of PAC through the injection line, and into the duct, when pressure in the injection line is above a draft-injection threshold.

7. The induced-draft PAC injection system of claim 1, further comprising a debris removal subsystem in fluid communication with the injection line, and having a draft from the injection line for limiting debris from accumulating when PAC is fed to the injection line by the feeder.

8. An induced-draft injection system to reduce the amount of an unwanted species in an effluent, the system comprising:
a first feeder having a species-removing substance;
an injection line in fluid communication with the first feeder; and
a duct under a negative pressure in fluid communication with the injection line;
wherein the duct is in fluid communication with the effluent having the unwanted species; and
wherein the negative pressure supports the transportation of at least a first portion of the species-removing substance fed from the first feeder through the injection line and into the duct, without requiring a blower, in order to position a bonding portion of the at least a first portion of the species-removing substance in contact with the unwanted species in the effluent.

9. The induced-draft injection system of claim 8, wherein the species-removing particulate comprises powdered activated carbon, and the unwanted species comprises mercury.

10. The induced-draft injection system of claim 8, wherein the injection line comprises a distribution portion including:
a first end;
a second end; and
at least two distribution ports between the first end and the second end in fluid communication with the duct, the at least two distribution ports having outlets with cross-sectional areas that progressively increase from the distribution port proximate the first end to the distribution port proximate the second end.

11. The induced-draft injection system of claim 8, wherein the injection line comprises an injection portion including:
a first end;
a second end; and
at least two injection ports between the first end and the second end, each injection port comprising:
an outlet in fluid communication with the duct; and
a fluid director directing a portion of the at least a first portion of species-removing substance through the outlet and into the duct, the fluid director in mechanical communication with less than the entire perimeter of the outlet.

12. The induced-draft injection system of claim 8, wherein the injection line comprises an injection portion including:
a first end;
a second end; and
at least two injection ports between the first end and the second end in fluid communication with the duct, the at least two injection ports having outlets with cross-sectional areas that progressively increase from the injection port proximate the first end to the injection port proximate the second end.

13. The induced-draft injection system of claim 8, wherein a portion of the injection line comprises a pressure relief subsystem providing fluid communication between the injection line and a relief source when pressure in the injection line is below a relief threshold.

14. The induced-draft injection system of claim 8, further comprising a blower providing a stream that aids transportation of the species-removing substance from a second feeder, through the injection line, and into the duct, when pressure in the injection line is above a draft-injection threshold.

15. The induced-draft injection system of claim 8, further comprising a debris removal subsystem in fluid communication with the injection line, and having a draft from the injection line for limiting debris from accumulating when the species-removing substance is fed to the injection line by the first feeder.

16. A method of injecting a substance into a duct using the system of claim 8, the method comprising:
inducing a negative pressure in the duct;
feeding the substance to the injection line;
transporting at least a portion of the substance through the injection line and into the duct using the negative pressure in the duct.

17. The method of injecting particulate into a duct of claim 16, wherein the substance comprises powdered activated carbon.

18. The method of injecting particulate into a duct of claim 16, further comprising providing fluid communication between the injection line and a relief source to increase pressure in the injection line when the pressure is below a relief threshold.

19. The method of injecting particulate into a duct of claim 16, the method further comprising blowing a portion of the substance through the injection line and into the duct with a blower when pressure in the injection line is above a draft-injection threshold.

20. An induced-draft injection system to reduce the amount of an unwanted species in an effluent, the system comprising:
an injection line coupled to a feeder having a species-removing substance; and
a duct under a negative pressure in fluid communication with the injection line and the effluent having the unwanted species; and
wherein the negative pressure in the duct induces a negative pressure in the injection line to transport at least a portion of the species-removing substance through the injection line and into the duct, without requiring a blower, in order to position a bonding portion of the at least a portion of the species-removing substance in contact with the unwanted species in the effluent.

* * * * *